United States Patent [19]
Collins, Jr. et al.

[11] Patent Number: 5,221,832
[45] Date of Patent: Jun. 22, 1993

[54] RASTER VARIATION METHOD FOR OMNIDIRECTIONAL OPTICAL SCANNERS

[75] Inventors: Donald A. Collins, Jr., Ithaca, N.Y.; Charles K. Wike, Jr.; Joseph M. Lindacher, both of Cambridge, Ohio

[73] Assignee: NCR Corporation, Dayton, Ohio

[21] Appl. No.: 759,317

[22] Filed: Sep. 13, 1991

[51] Int. Cl.⁵ .............................................. G02B 26/08
[52] U.S. Cl. ...................................... 235/467; 235/464
[58] Field of Search .................................. 235/464, 467

[56] References Cited

U.S. PATENT DOCUMENTS

| | | | |
|---|---|---|---|
| 4,795,224 | 1/1989 | Goto | 235/467 |
| 4,871,904 | 10/1989 | Metlitsky et al. | 235/467 |
| 4,923,623 | 5/1990 | Johnson | 350/6.9 |
| 4,971,410 | 11/1990 | Wike, Jr. et al. | 235/467 |

Primary Examiner—Paul M. Dzierzynski
Assistant Examiner—Don Wong
Attorney, Agent, or Firm—Paul W. Martin

[57] ABSTRACT

A method for optimizing the reading ability of an omnidirectional optical scanner for various bar code label aspect ratios which can effectively double the angular coverage of an ordinary scan module. For high aspect ratio bar code labels, the method involves increasing the speed ratio between a first scanner motor within a scan module and a second scanner motor within a tilted mirror assembly by decreasing the speed of the second scanner motor by a predetermined amount. For other bar code labels, the method involves decreasing the speed ratio between the first scanner motor and the second scanner motor by increasing the speed of the second scanner motor by the predetermined amount. The method uses programming tags and speed control circuitry to change the speed of the second motor. The method also includes the steps of decreasing the swipe speed of articles having high aspect ratio bar code labels and increasing the swipe speed of other articles.

3 Claims, 4 Drawing Sheets

RASTER VARIATION METHOD FOR OMNIDIRECTIONAL OPTICAL SCANNERS

CROSS REFERENCE TO RELATED APPLICATION

The present invention is related to, assigned and co-pending U.S. application No. 07/759,316, filed on 9/13/91, "Compact Bar Code Scanner", invented by Collins, and filed concurrently with the present application.

BACKGROUND OF THE INVENTION

The present invention relates to optical scanning devices and more specifically to a raster variation method for omnidirectional optical scanners.

Optical scanners are well known for their usefulness in retail checkout and inventory control. Optical scanners generally employ a laser diode, the light from which is focused and collimated to produce a scanning beam. An optical transceiver directs the beam against a plurality of stationary pattern mirrors to form multiple lines and collects the scanning light after it is reflected by a bar code label. A motor rotates the optical transceiver, and a detector receives the returning beam. An example of an optical scanner can be found in commonly assigned U.S. Pat. No. 4,971,410, entitled, "Scanning and Collection System for a Compact Laser", issued Nov. 20, 1990, to Wike, Jr. et al. This patent is hereby incorporated by reference.

The more lines a scan pattern has, the more efficient scanning operations are. Unfortunately, the number of scan lines produced by prior art scanners is determined by the number of scanning beams generated, which is determined by the number of stationary pattern mirrors used. Depending on the size of the bar code label to be read, prior optical scanners have employed interchangeable scanning heads, which produce different scan patterns which vary in the size and the number of scan lines forming the scan pattern.

Therefore, it would be desirable to generate a scan pattern having a density of scan lines sufficient to allow an optical scanner to scan different size bar code labels with the same reading efficiency. It would also be desirable to vary this scan pattern to match the aspect ratio of the bar code label.

SUMMARY OF THE INVENTION

In accordance with the teachings of the present invention, a raster variation method for an omnidirectional optical scanner is provided. The omnidirectional optical scanner employs a scanning assembly, a tilted mirror assembly, and a printed circuit board (PCB). The scanning assembly includes a scanning module for generating a multiple scan line pattern and for receiving light reflected from a bar code label.

The scanning module includes a motor for rotating a hollow drive shaft and an optical transceiver mounted on the drive shaft, which projects a laser light beam outwardly towards a ring of stationary pattern mirrors to form a multi-line scan pattern. The transceiver collects the reflected light from the coded indicia of a bar code label and directs the light at a photodetector.

The tilted mirror assembly includes a mirror and a motor. Preferably, the motor of the scan module and the motor of the tilted mirror assembly rotate in opposite directions. The mirror is off-set mounted on the drive shaft of the motor. The multi-line scan pattern generated by the stationary mirrors is projected onto the tilted mirror. The rotation and tilt of the mirror produce a raster effect which generates a dense multi-line scan pattern. The dense multi-line scan pattern is projected toward a bar code label. The density of the scan lines is controlled by speed control circuitry mounted on the PCB.

The PCB contains circuitry for processing and controlling the omnidirectional scanner, including a controller and circuitry for controlling the speed of the tilted mirror assembly motor.

The method of the present invention optimizes the reading ability of an omnidirectional optical scanner for various bar code label aspect ratios. For high aspect ratio bar code labels, the method involves increasing the speed ratio between the first scanner motor within the scan module and the second scanner motor within the tilted mirror assembly by decreasing the speed of the second scanner motor by a predetermined amount. For other bar code labels, the method involves decreasing the speed ratio between the first scanner motor and the second scanner motor by increasing the speed of the second scanner motor by the predetermined amount. The method uses programming tags and speed control circuitry to change the speed of the second motor.

The method also includes the steps of decreasing the swipe speed of articles having high aspect ratio bar code labels and increasing the swipe speed of other articles.

It is a feature of the omnidirectional scanner that the angle of an individual scan line changes as it rasters up or rasters down to enhance the angular coverage of the first scan pattern. The method of the present invention optimizes this effect by properly selecting the speed ratio of the first motor to the tilted mirror assembly motor to effectively double the angular coverage of the scan module and thereby double the aspect ratio for which the pattern of the scanner is omnidirectional.

It is another feature of the present invention that the speed of the tilted mirror assembly motor is easily changed by using ordinary speed control circuitry and scanning programming tags.

It is another feature of the present invention that the speed of the first motor within the scan module remains fixed for simplicity of operation and structure, and therefore a minimum of cost.

It is accordingly an object of the present invention to provide a raster variation method for an omnidirectional scanner.

It is a further object of the present invention to provide a raster variation method for an omnidirectional scanner including a scan module containing a first motor and a tilted mirror assembly containing a second motor, the second scanner motor driving a tilted mirror for reflecting a scan pattern from the scanning module.

It is a further object of the present invention to provide a raster variation method for an omnidirectional scanner which varies the speed ratio between the first scanner motor and the tilted mirror assembly motor.

It is a further object of the present invention to provide a raster variation method for an omnidirectional scanner which varies the speed ratio between the first scanner motor and the tilted mirror assembly motor to effectively double the angular coverage of the scan module and thereby double the aspect ratio for which the pattern of the scanner is omnidirectional.

It is a further object of the present invention to provide a raster variation method for an omnidirectional scanner which increases the speed ratio between the first scanner motor and the tilted mirror assembly motor for high aspect ratio bar code labels.

It is a further object of the present invention to provide a raster variation method for an omnidirectional scanner which varies the speed of the tilted mirror assembly motor, but keeps the speed of the first motor constant.

It is a further object of the present invention to provide a raster variation method for an omnidirectional scanner which varies the speed of the tilted mirror assembly motor, but keeps the speed of the first motor constant, by using ordinary speed control circuitry and scanning programming tags.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
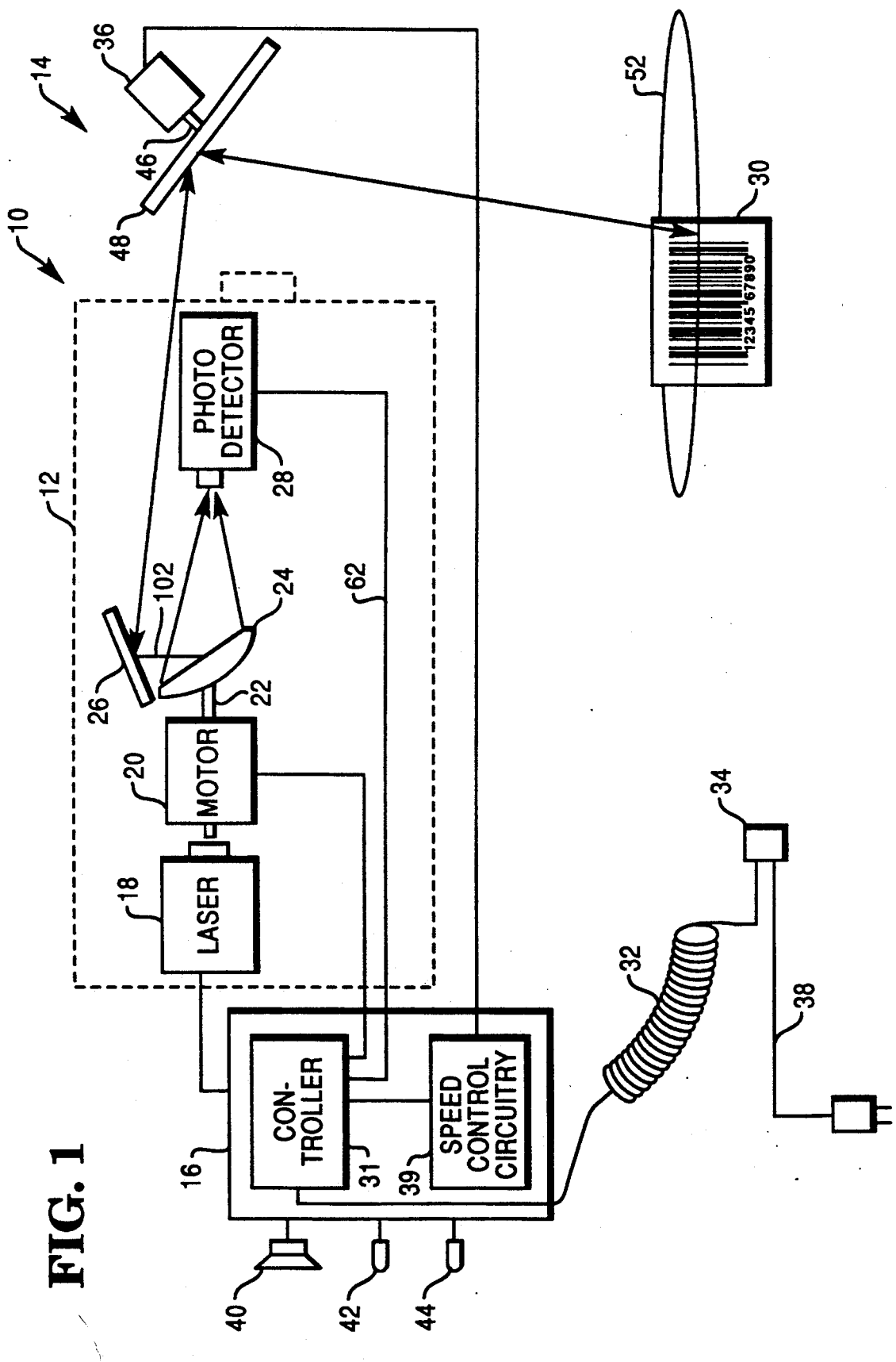
FIG. 1 is a detailed schematic representation of an optical scanner used in implementing the method of the present invention.

Referring now to FIG. 1, optical scanner 10 includes scan module 12, tilted mirror assembly 14, and printed circuit board (PCB) 16. Scan module 12 produces a first scan pattern 17 (FIG. 2) and includes laser 18, motor 20 for driving a hollow shaft 22, transceiver 24 mounted to the end of shaft 22, pattern generating mirrors 26, and photodetector 28. Laser 18 projects a laser beam through hollow drive shaft 22 to be deflected by transceiver 24 towards pattern generating mirrors 26. Mirrors 26 deflect the first pattern towards tilted mirror assembly 14. Light reflected from bar code label 30 is redirected towards pattern generating mirrors 26. Pattern generating mirrors 26 direct the light at transceiver 24 which directs the light to photodetector 28. The construction of scan module 12 is fully disclosed in U.S. Pat. No. 4,971,410, which is assigned to the assignee of the present invention and which is fully incorporated by reference.

PCB 16 contains processing circuitry, including a controller 31, for decoding signals generated by photodetector 28 and transmitting the decoded signals over coiled cable 32 to remote processing member 34. Power is supplied to laser 18, motor 20, tilted mirror assembly motor 36, and photodetector 28 through electrical plug 38 and cable 32. Motor 36 is coupled to speed control circuitry 39. Printed circuit board 16 additionally contains circuitry for operating speaker 40, and green and red indicator lights 42 and 44, which represent valid and invalid reading operations, respectively.

Tilted mirror assembly 14 includes motor 36 having drive shaft 46 and rotating reflecting mirror 48, which is offset-mounted to drive shaft 46. Preferably, motor 36 and motor 20 rotate in opposite directions. Motor shaft 46 is oriented at an angle to drive shaft 22, which preferably is forty-five degrees. In the preferred embodiment, bar code label 30 may also be a programming tag for programming the speed of motor 36.

A feature of scanner 10 is that the speed ratio of motor 20 to motor 36 is selectable. Preferably, the speed of motor 36 is one-twentieth the speed of motor 20, which in the preferred embodiment is forty-eight hundred rpm. Although integer values for the motor speed ratio are preferred, non-integer values are also envisioned, especially to compensate for motor speed ratio drift.

Figure 2:
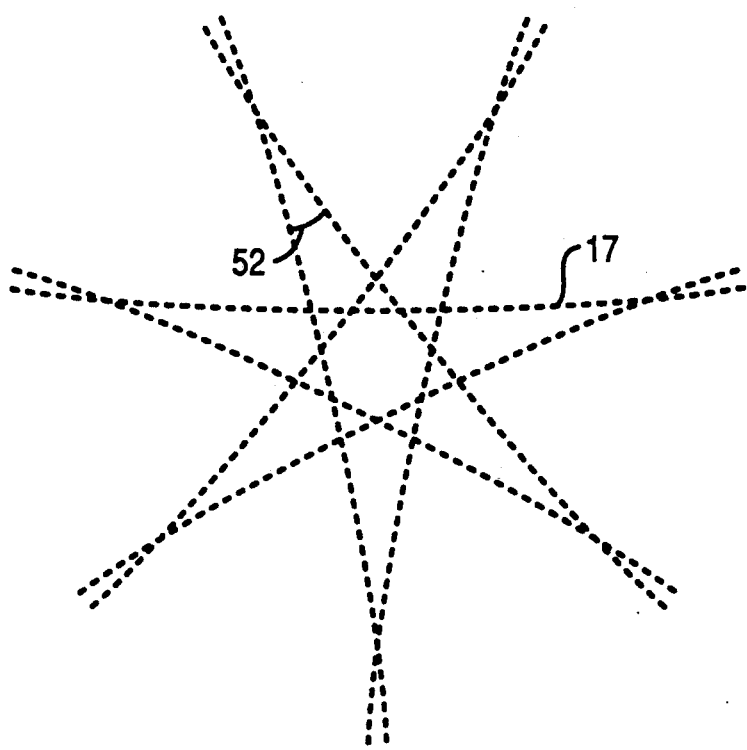
FIG. 2 is a plan view of a scan pattern generated by the scan module of FIG. 1.

Referring now to FIG. 2, scan pattern 17 is a star pattern. The points of the star subtend an angle 52, which in the preferred embodiment is about twenty-six degrees.

Figure 3:
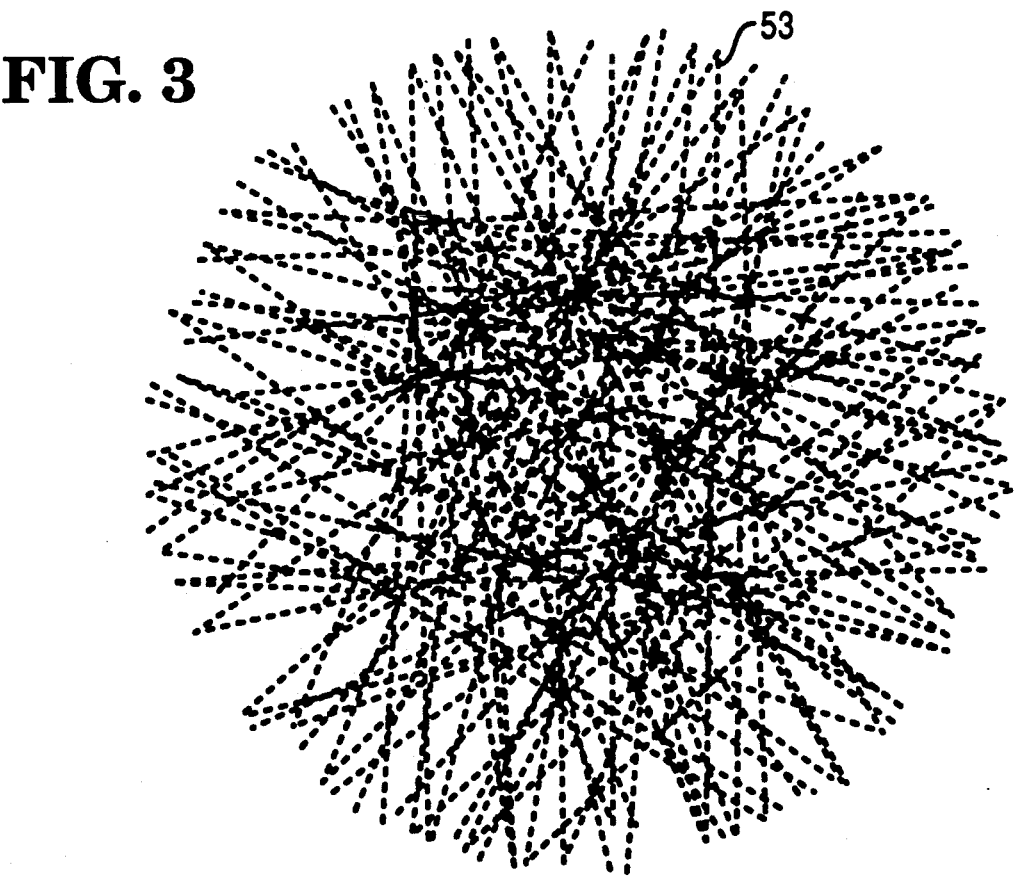
FIG. 3 is a plan view of a scan pattern generated by a tilted reflecting mirror.

Referring now to FIG. 3, tilted mirror assembly 14 uses first pattern 17 generated by scan module 12 to produce a highly-dense, second scan pattern 53. First scan pattern 17 is projected onto rotating reflecting mirror 48, which rotates scan pattern 17 about the tilted axis of drive shaft 46 to form scan pattern 53. Advantageously, tilted mirror assembly 14 improves the reading efficiency of scanner 10, irrespective of the size or orientation of bar code label 30.

Figure 4A:
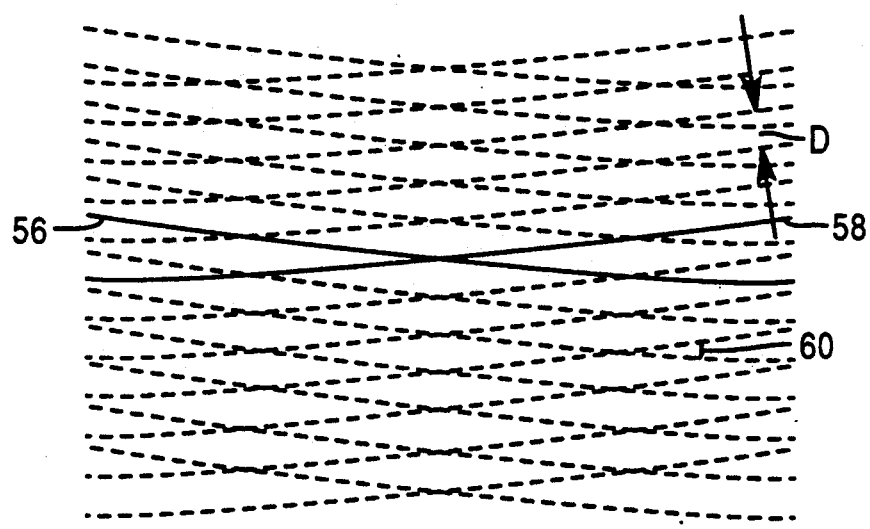
FIG. 4A is a plan view of a part of a first scan pattern produced by the optical scanner at a first tilted mirror speed.

Turning now to FIG. 4A, the rotation and tilt of mirror 48 create a raster effect. During the first half-cycle of mirror 48, motor 20 completes a predetermined number of revolutions, each revolution producing a complete scan pattern 17. Since mirror 48 is tilted with respect to shaft 46, mirror 48 presents an increasing angle of incidence during one half-cycle and a decreasing angle of incidence during the other half-cycle. The increase and decrease in angle of incidence cause lines from scan pattern 17 to be spread out in the scanning reference plane above scanner 10. It is a feature of scanner 10 that the angle of an individual scan line changes as it rasters up or rasters down to enhance the angular coverage of the first scan pattern. The method of the present invention optimizes this effect by properly selecting the speed ratio of the first motor to the tilted mirror assembly motor to effectively double the angular coverage of the scan module and thereby doubles the aspect ratio for which the pattern of the scanner is omnidirectional.

Reflected lines 56 originate from one line of scan pattern 17 and follow one after the other in one direction to describe a raster down effect. Reflected lines 58 also originate from the one scan line and follow one after the other in an opposite direction to describe a raster up effect. Combining the raster lines of all of the scan lines of scan pattern 17 produces scan pattern 53.

A feature of this combination is the angular multiplication effect. The angle 60 between crossing raster up and raster down lines 56 and 58 is approximately twice the angle of one of either of these lines with respect to a scanned article. Angle 60 varies with the distance or raster width D separating the raster lines from each other, which is a function of the speed ratio of motors 20 and 36. High speed ratios produce more lines separated by less distance and therefore subtended by smaller angles.

Figure 4B:
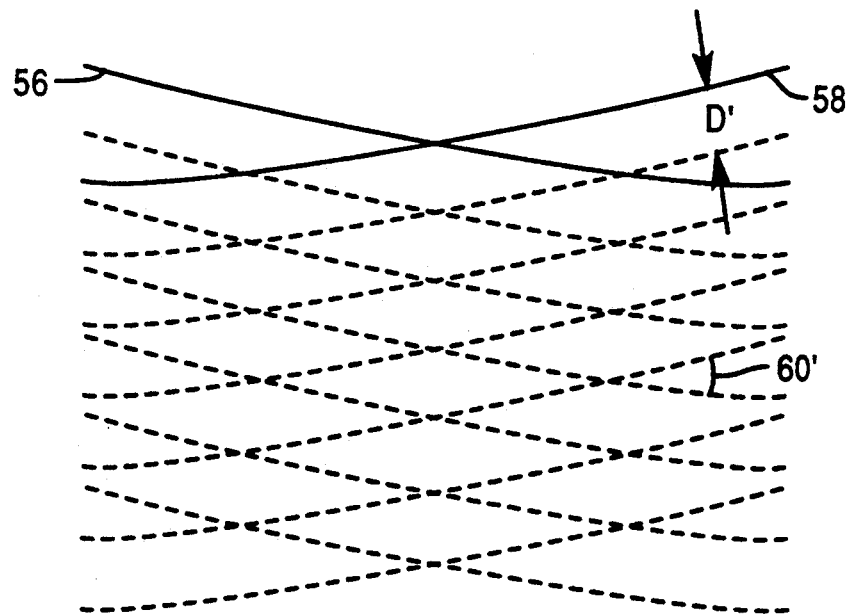
FIG. 4B is a plan view of a part of a second scan pattern produced by the optical scanner at a second tilted mirror speed.

Turning now to FIG. 4B, a part of a second scan pattern from scanner 10 has a larger raster width D', a larger angle 60', and a lower number of scan lines 56 and 58 than the scan pattern of FIG. 4A. This scan pattern is suited for reading high aspect bar code labels and is produced by increasing the speed ratio between motors 20 and 36.

The method of the present invention envisions altering the speed ratio of motors 20 and 36 to optimize scanning efficiency for different aspect ratio bar code labels. Increasing the speed ratio of motor 20 to motor 36 optimizes scanning efficiency for high aspect ratio bar code labels, but requires slower article swiping speeds. Here, high aspect ratio bar code labels are those having a length to width ratio between three and six. Decreasing the speed ratio optimizes scanning efficiency for other aspect ratio bar code labels and permits faster article swiping speeds.

In the preferred embodiment, the speed of motor 20 is fixed to match the processing resolution of the controller 31; therefore, the speed of motor 36 is altered to match the aspect ratio of the label to be scanned. The speed of motor 36 may be altered using programming tags, which are bar code labels containing programming information, and motor speed control circuitry 39.

Figure 5:
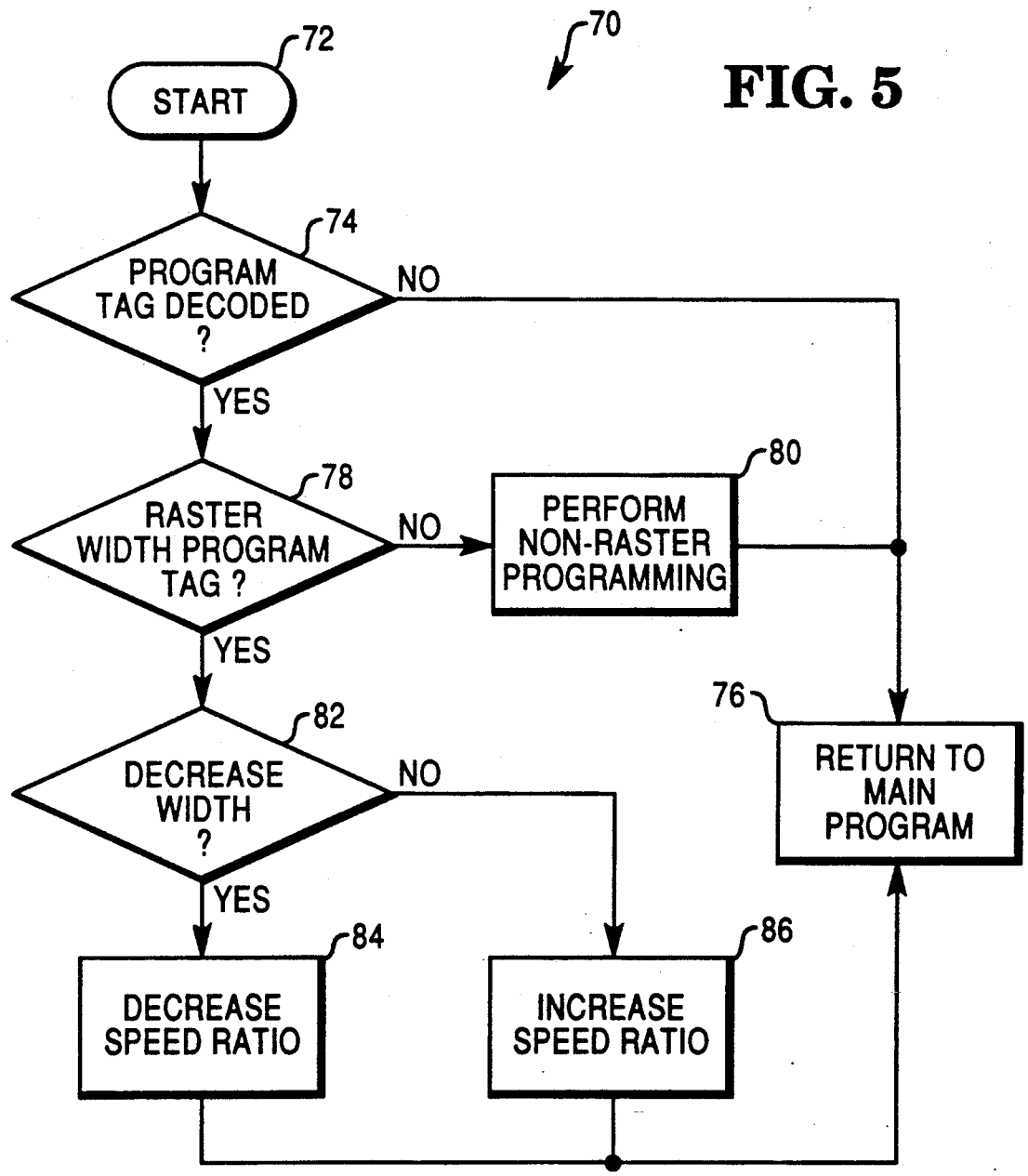
FIG. 5 is a flow chart of the method of the present invention.

Turning now to FIG. 5, method 70 of the present invention begins at "START" 72. In block 74, method 70 awaits programming instructions from programming tags. If programming instructions have not been read by scanner 10, then method 70 returns to the main program for operating scanner 10 in block 76.

If programming instructions have been read, then method 70 determines the type of programming instructions read in block 78. If the programming instructions are not related to raster width, then method 70 performs non-raster programming in block 80 and then returns to the main program in block 76.

If the programming instructions are related to raster width, then method 70 determines whether the programming instructions call for a decrease in raster width in block 82. If the programming instructions call for a decrease in raster width, then method 70 decreases the speed ratio of motor 20 to motor 36. In the preferred embodiment, the speed of motor 20 is fixed and the speed of motor 36 is increased by a predetermined speed increment in block 84. Method 70 then returns to the main program in block 76. In the preferred embodiment, the predetermined increment is one twentieth of the speed of motor 20. If the speed of motor 20 is fortyeight hundred rpm, then the increment is two-hundred-and-forty rpm.

If the programming instructions are not related to decreasing the raster width, then the programming instructions call for an increase in raster width. Method 70 increases the speed ratio, as represented in block 86, and then returns to the main program in block 76. In the preferred embodiment, the speed of motor 20 is fixed and the speed of motor 36 is decreased by a predetermined increment. In the preferred embodiment, the predetermined increment is one twentieth of the speed of motor 20.

Advantageously, the method of the present invention effectively doubles the angular coverage of the scan module and thereby doubles the aspect ratio for which the pattern of the scanner is omnidirectional.

Although the invention has been described with particular reference to certain preferred embodiments thereof, variations and modifications of the present invention can be effected within the spirit and scope of the following claims.

What is claimed is:

1. A method for optimizing the reading ability of an omnidirectional optical scanner for various bar code label aspect ratios comprising the steps of:
    (a) providing a scan module, having a plurality of stationary pattern mirrors and an optical transceiver rotated by a first scanner motor for directing a laser beam towards the pattern mirrors, for producing a plurality of different scan lines and collecting light from articles having bar code labels to be scanned;
    (b) providing a single tilted mirror assembly, having a second scanner motor for turning a drive shaft and mirror mounted at an angle to the drive shaft for reflecting the scan lines from the scan module for scanning an article having a bar code label which is swiped past the scanner at a predetermined swipe speed;
    (c) if the bar code label is a high aspect bar code label, increasing the speed ratio between the first scanner motor and the second scanner motor, including the substep of:
        (c-1) decreasing the speed of the second scanner motor by a first predetermined amount;
    (d) decreasing the swipe speed of the high aspect bar code label past the scanner; and
    (e) collecting and decoding light reflected from the high aspect ratio bar code label; or
    (f) if the bar code label has any other aspect ratio, decreasing the speed ratio between the first scanner motor and the second scanner motor, including the substep of:
        (f-1) increasing the speed of the second scanner motor by a second predetermined amount;
    (g) increasing the swipe speed of the other bar code label past the scanner; and
    (h) collecting and decoding light reflected from the other bar code label.

2. The method as recited in claim 1, wherein substep (c-1) comprises the substeps of:
    (C-1-A) scanning a programming tag having program instructions for a controller to decrease the speed of the second scanner motor by the first predetermined amount; and
    (c-1-B) sending controller instructions to decrease the speed of the second scanner motor to speed control circuitry coupled between the controller and the second scanner motor.

3. The method as recited in claim 1, wherein substep (f-1) comprises the substeps of:
    (f-1-a) scanning a programming tag having program instructions for a controller to increase the speed of the second scanner motor by the second predetermined amount; and
    (f-1-B) sending controller instructions to increase the speed of the second scanner motor to speed control circuitry coupled between the controller and the second scanner motor.

* * * * *